(12) United States Patent
Kwon et al.

(10) Patent No.: US 8,336,934 B2
(45) Date of Patent: Dec. 25, 2012

(54) BUMPER BEAM ASSEMBLY FOR VEHICLE

(75) Inventors: Jeong Hwan Kwon, Ulsan (KR); Inho Choi, Gunpo-si (KR); Nakseung Jung, Gwangmyung-si (KR); Mun Yong Lee, Pusan (KR); Sang Eon Park, Busan (KR)

(73) Assignees: Hyundai Motor Company, Seoul (KR); Sungwoo Hitech Co., Ltd., Pusan (KR)

( * ) Notice: Subject to any disclaimer, the term of this patent is extended or adjusted under 35 U.S.C. 154(b) by 0 days.

(21) Appl. No.: 13/114,818

(22) Filed: May 24, 2011

(65) Prior Publication Data

US 2011/0285152 A1 Nov. 24, 2011

(51) Int. Cl.
*B60R 19/24* (2006.01)

(52) U.S. Cl. ........................................ 293/133; 293/154

(58) Field of Classification Search .................. 293/102, 293/133, 154
See application file for complete search history.

(56) References Cited

U.S. PATENT DOCUMENTS

| | | | |
|---|---|---|---|
| 5,876,078 A * | 3/1999 | Miskech et al. | 293/133 |
| 6,179,355 B1 * | 1/2001 | Chou et al. | 293/132 |
| 6,334,638 B1 | 1/2002 | Yamamuro et al. | |
| 6,554,333 B2 * | 4/2003 | Shimotsu et al. | 293/132 |
| 2002/0113447 A1 * | 8/2002 | Frank | 293/133 |
| 2003/0141729 A1 * | 7/2003 | Burkhardt et al. | 293/133 |
| 2004/0169383 A1 * | 9/2004 | Shimotsu | 293/133 |
| 2008/0315597 A1 * | 12/2008 | Ichikawa et al. | 293/102 |

FOREIGN PATENT DOCUMENTS

| | | |
|---|---|---|
| JP | 2009-241869 A | 10/2009 |
| KR | 10-0402855 B1 | 10/2003 |
| KR | 10-0932674 B1 | 12/2009 |

* cited by examiner

*Primary Examiner* — Jason S Morrow

(74) *Attorney, Agent, or Firm* — Morgan, Lewis & Bockius LLP

(57) ABSTRACT

A bumper beam assembly for a vehicle may include a bumper beam having a horizontal support plate, front and rear vertical support plates attached to the horizontal support plate, wherein the rear vertical support plate includes an insertion hole, a partition formed along the horizontal support plate between the front and rear vertical support plates, and a stay, an end portion of which may be inserted into the insertion hole.

10 Claims, 6 Drawing Sheets

BUMPER BEAM ASSEMBLY FOR VEHICLE

CROSS-REFERENCE TO RELATED APPLICATION

The present application claims priority to Korean Patent Application No. 10-2010-0048210 filed in the Korean Intellectual Property Office on May 24, 2010, the entire contents of which is incorporated herein for all purposes by this reference.

BACKGROUND OF THE INVENTION

1. Field of the Invention

The present invention relates to a bumper beam assembly for a vehicle. More particularly, the present invention relates to a bumper beam assembly for a vehicle that may enhance assembly strength when assembling a bumper beam and a stay.

2. Description of Related Art

Generally, a bumper is a part of a vehicle designed to help it withstand impact of a collision and the bumpers are disposed forward and rearward of the vehicle to minimize deformation of the vehicle in collision.

As shown in FIG. 6, a bumper 100 includes a bumper beam unit 105 including a bumper beam 101 disposed along vehicle width direction at forward and rearward of a vehicle and a stay 103 interposed between the bumper beam 101 and a side member 111 of a vehicle body, an energy absorber 107 disposed front of the bumper beam 101 for absorbing impact and a bumper cover 109 covering the bumper beam 101 and the energy absorber 107.

The stay 103 is connected to a rear portion of the bumper beam 101 and then the conventional bumper beam unit 105 is assembled to the side member 111.

Recently the bumper beam 101 has been manufactured by aluminum material and made by extrusion molding for reducing weight replacing steel material corresponding trend lightweight vehicle, and also, the stay has been made of aluminum material and made by extrusion molding.

If the bumper beam 101 and the stay 103, which are made by aluminum extrusion molding, are assembled by laser welding, pore or crack may be generated in welding portion and thus generally those are assembled by mechanical assembling such as bolt engagement and so on.

However, if the bumper beam 101 and the stay 103 are assembled by mechanical assembling such as bolt, impact energy transferred from the bumper beam 101 may be concentrated on the bolt connecting portion in collision and thus assembling portion of the bumper beam 101 and the stay 103 may be easily deformed and impact energy dispersion and absorption may be deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a bumper beam assembly for a vehicle having advantages of simplifying assembling of and enhancing assembly strength.

A bumper beam assembly for a vehicle may include a bumper beam having a horizontal support plate, front and rear vertical support plates attached to the horizontal support plate, wherein the rear vertical support plate may include an insertion hole, a partition formed along the horizontal support plate between the front and rear vertical support plates, and a stay, an end portion of which may be inserted into the insertion hole.

The end portion of the stay may be engaged with the front vertical support plate through the insertion hole.

The partition may be formed on an inner surface of the front vertical support plate and extends toward the rear vertical support plate.

A partition groove may be formed to the end portion of the stay for the partition to be inserted therein.

A mounting hole may be formed to the horizontal support plate, an engage hole may be formed to the end portion of the stay corresponding to the position of the mounting hole, and the bumper beam and the stay may be connected through engagement of the mounting hole and the engage hole.

A nut may be connected to the engage hole, and a bolt may be connected to the nut for the bumper beam and the stay to be connected.

The nut may be connected to an inside of the engage hole by welding.

The nut may be a pop nut.

A mounting bracket may be connected to the other end portion of the stay.

The insertion hole may be correspondingly formed to periphery of the end portion of the stay.

The bumper beam may be made of aluminum material and made by extrusion molding.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
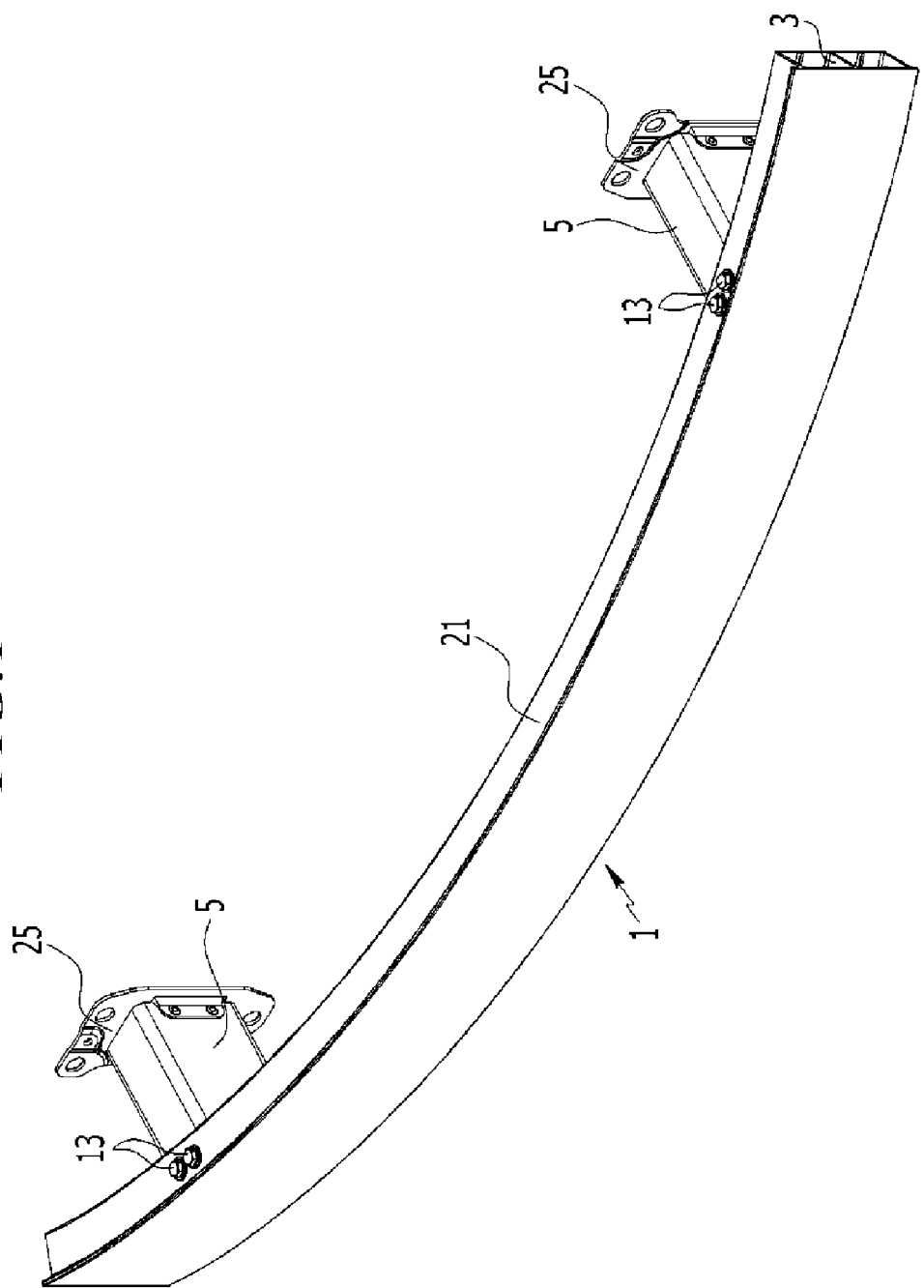
FIG. 1 is a perspective view showing a bumper beam assembly according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 2:
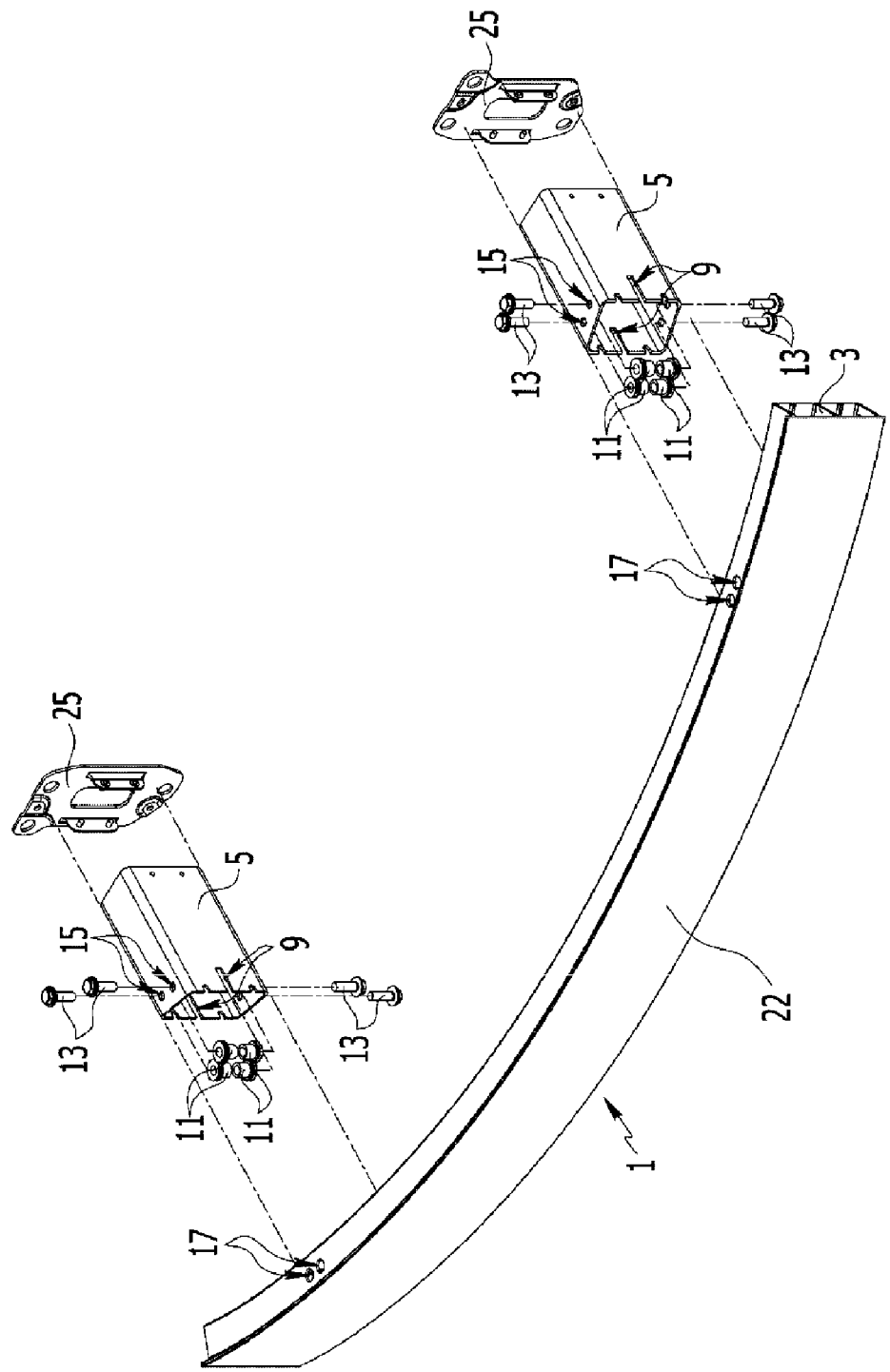
FIG. 2 and FIG. 3 are frontward and rearward exploded perspective views showing a bumper beam assembly according to an exemplary embodiment of the present invention.
Figure 3:
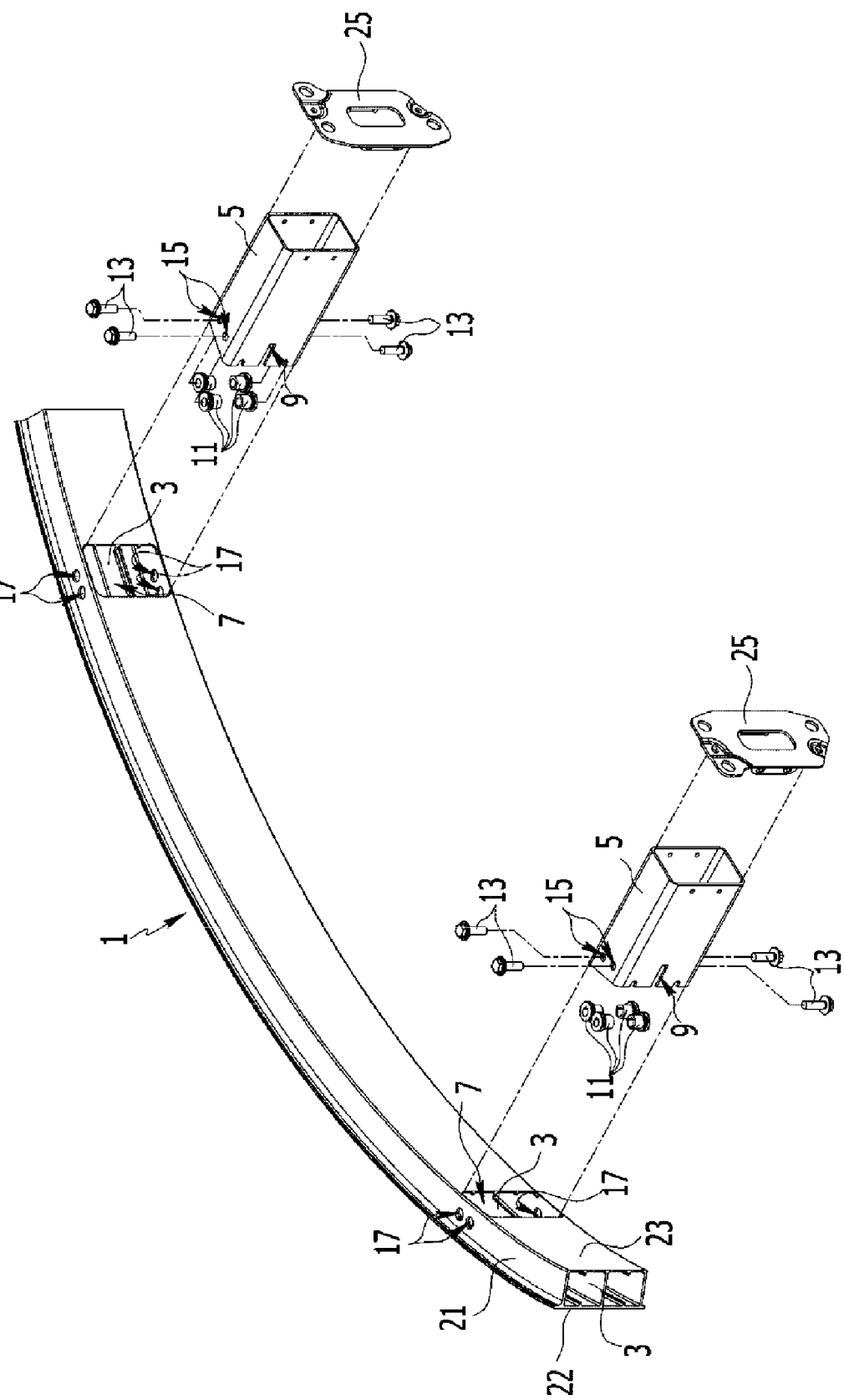

FIG. 1 is a perspective view showing a bumper beam assembly according to an exemplary embodiment of the present invention and FIG. 2 and FIG. 3 are frontward and rearward exploded perspective views showing a bumper beam assembly according to an exemplary embodiment of the present invention.

A bumper beam assembly for a vehicle according to an exemplary embodiment of the present invention includes a bumper beam 1 including a horizontal support plate 21, a front vertical support plate 22, rear vertical support plate 23 of which an insertion hole 7 is formed thereto and a partition 3 formed therewithin along the horizontal support plate 21 and a stay 5 inserted into the insertion hole 7.

The bumper beam 1 and the stay 5 may be made of aluminum material and made by extrusion molding.

A partial portion of the partition 3 where the insertion hole 7 is formed at rear side of the bumper beam 1 may be eliminated along forward and rearward direction.

The insertion hole 7 is correspondingly formed to periphery of the stay 7.

Figure 4:
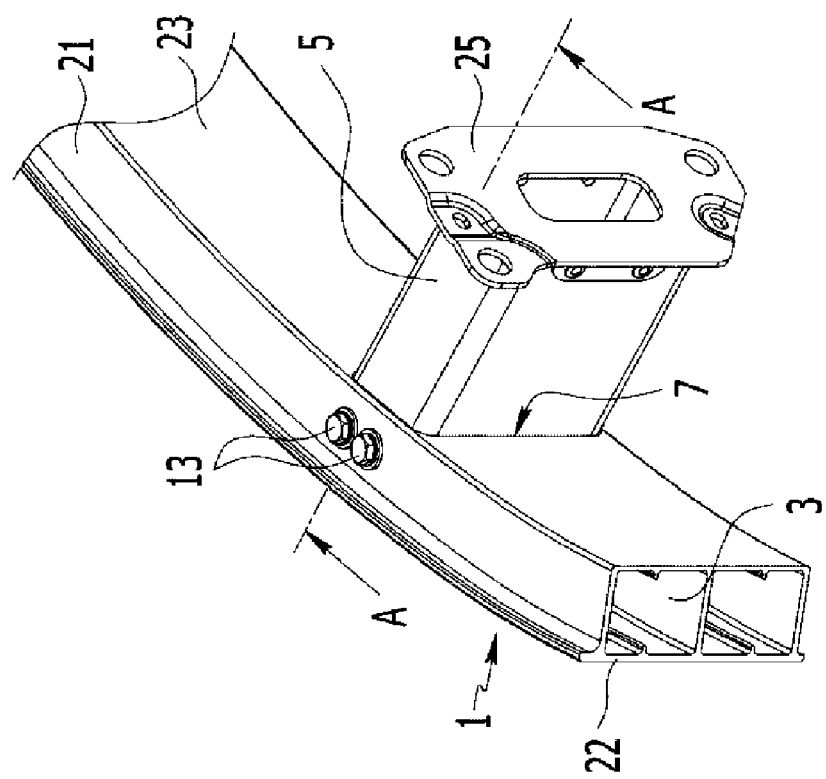
FIG. 4 is an enlarged perspective view showing an assemble portion of a bumper beam and a stay of a bumper beam assembly according to an exemplary embodiment of the present invention.
Figure 5:
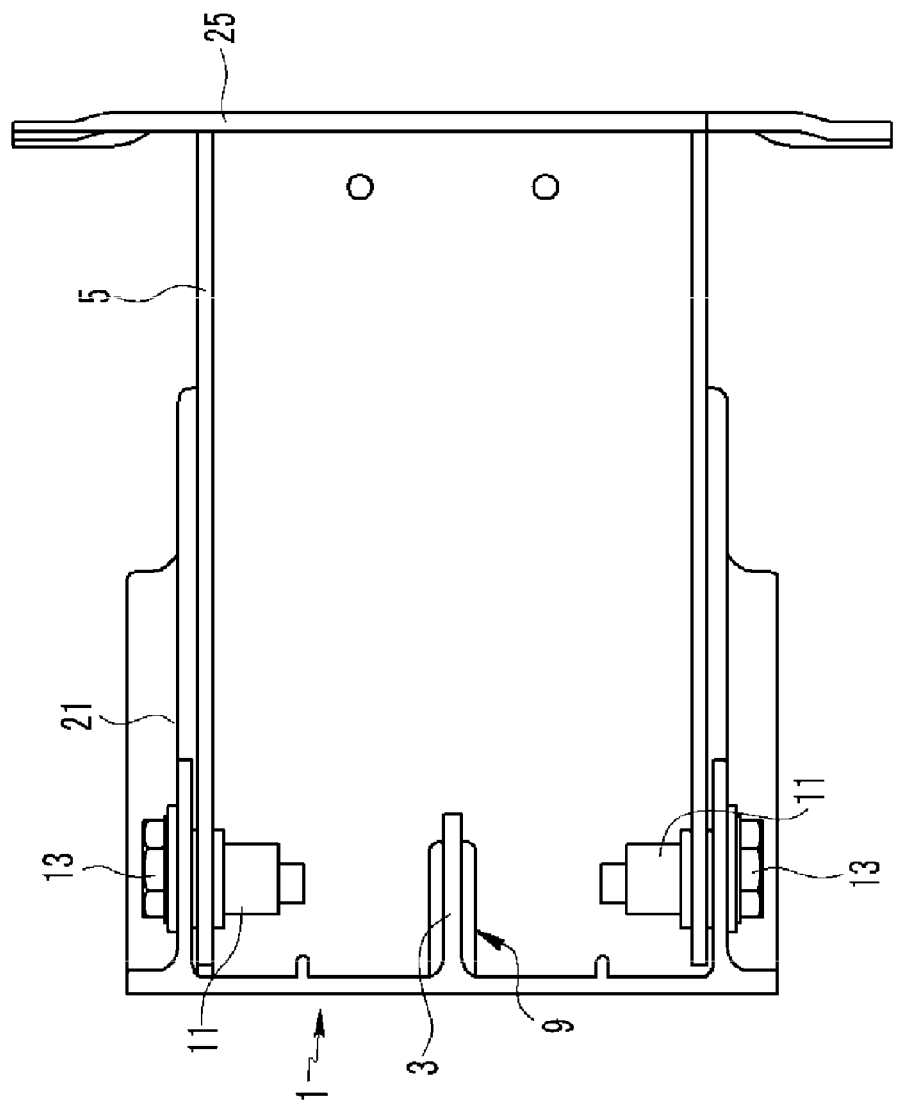
FIG. 5 is a cross-sectional view along line A-A of FIG. 4.
Figure 6:
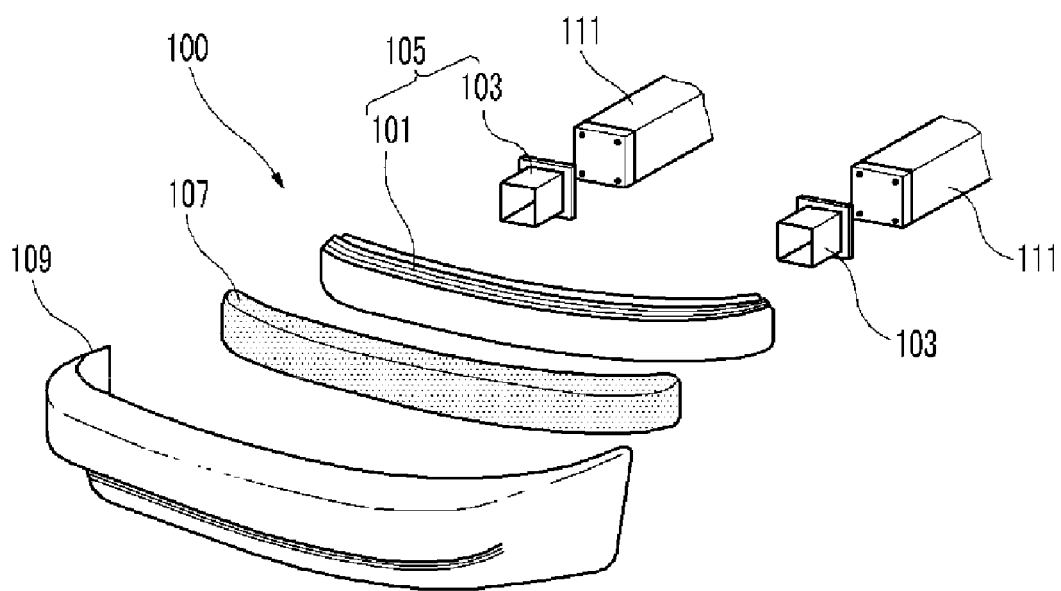
FIG. 6 is an exploded perspective view of a conventional bumper beam unit.

At one end of the stay 5, as shown in FIG. 4 and FIG. 5, a partition groove 9 is formed for the partition 3 to be inserted into therein.

In an exemplary embodiment of the present invention, the one end of the stay 5 may be engaged with the front vertical support plate 22.

A mounting hole 17 is formed to the horizontal support plate 21, an engage hole 15 is formed to the stay 5 corresponding to the position of the mounting hole 17 and the bumper beam 1 and the stay 5 are connected through the mounting hole 17 and the engage hole 15.

A nut 11 is connected to the engage hole 15 and a bolt 13 is connected to the nut 11 for the bumper beam 1 and the stay 5 to be connected.

A mounting bracket 25 is connected to the other end of the stay 5.

The nut 11 may be connected to an inside of the engage hole 15 by welding or the nut 11 may be a pop nut and connected to the engage hole 15.

As described above, the nut 11 is connected to the stay 5, and then, as shown in FIG. 5, the end of the stay 5 is inserted into the insertion hole 7 of the bumper beam 1 and simultaneously the partition 3 is inserted into the partition groove 9 and then the bolt 13 is engaged with the nut 11 within the stay 5 through the mounting hole 17 and the engage hole 15 and thus assembling is completed.

And thus, the bumper beam assembly for a vehicle according to the exemplary embodiment of the present invention is simplified in manufacturing.

Since the bumper beam 1 and the stay 5 are engaged by inserting one end of the stay 5 into the insertion hole 7 of the bumper beam 1, partial impact energy transferred from the bumper beam 1 may be transferred to a vehicle body through the stay 5 besides the bolt 15 engaging portion and thus assembling portion of the bumper beam 1 and the stay 5 may not be easily damaged or deformed. And thus, impact energy dispersion and absorption may be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bumper beam assembly for a vehicle comprising:
   a bumper beam having:
   a horizontal support plate;
   front and rear vertical support plates attached to the horizontal support plate, wherein the rear vertical support plate includes an insertion hole;
   a partition formed along the horizontal support plate between the front and rear vertical support plates; and
   a stay, an end portion of which is inserted into the insertion hole;
   wherein a partition groove is formed to the end portion of the stay for the partition to be inserted therein.

2. The bumper beam assembly of claim 1, wherein the end portion of the stay is engaged with the front vertical support plate through the insertion hole.

3. The bumper beam assembly of claim 1, wherein the partition is formed on an inner surface of the front vertical support plate and extends toward the rear vertical support plate.

4. The bumper beam assembly of claim 1, wherein:
   a mounting hole is formed to the horizontal support plate;
   an engage hole is formed to the end portion of the stay corresponding to the position of the mounting hole; and
   the bumper beam and the stay are connected through engagement of the mounting hole and the engage hole.

5. The bumper beam assembly of claim 4, wherein a nut is connected to the engage hole, and
   a bolt is connected to the nut for the bumper beam and the stay to be connected.

6. The bumper beam assembly of claim 5, wherein the nut is connected to an inside of the engage hole by welding.

7. The bumper beam assembly of claim 6, wherein the nut is a pop nut.

8. The bumper beam assembly of claim 1, wherein a mounting bracket is connected to the other end portion of the stay.

9. The bumper beam assembly of claim 1, wherein the insertion hole is correspondingly formed to periphery of the end portion of the stay.

10. The bumper beam assembly of claim 1, wherein the bumper beam is made of aluminum material and made by extrusion molding.

* * * * *